(12) United States Patent
Otaka

(10) Patent No.: US 7,693,404 B2
(45) Date of Patent: Apr. 6, 2010

(54) IMAGE TAKING DEVICE

(75) Inventor: Hiroyuki Otaka, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 901 days.

(21) Appl. No.: 11/505,927

(22) Filed: Aug. 18, 2006

(65) Prior Publication Data

US 2007/0047934 A1 Mar. 1, 2007

(30) Foreign Application Priority Data

Aug. 26, 2005 (JP) .............................. 2005-245149

(51) Int. Cl.
*G03B 17/00* (2006.01)
*H04N 5/228* (2006.01)
*G02B 27/64* (2006.01)

(52) U.S. Cl. .................. 396/55; 348/208.4; 348/208.99; 359/554; 359/555; 359/557

(58) Field of Classification Search ..................... 396/55
See application file for complete search history.

(56) References Cited

U.S. PATENT DOCUMENTS

| 7,405,888 | B2 * | 7/2008 | Otaka .......................... 359/696 |
| 7,440,688 | B2 * | 10/2008 | Uehara et al. .................. 396/55 |
| 7,477,840 | B2 * | 1/2009 | Nomura et al. ................. 396/55 |
| 7,536,091 | B2 * | 5/2009 | Nomura et al. ................. 396/55 |
| 2009/0086035 | A1 * | 4/2009 | Suzuki et al. ............ 348/208.5 |

FOREIGN PATENT DOCUMENTS

| JP | 10-090587 A | 4/1998 |
| JP | 11-258649 A | 9/1999 |
| JP | 2000-075338 A | 3/2000 |

\* cited by examiner

*Primary Examiner*—Melissa J Koval
(74) *Attorney, Agent, or Firm*—Sughrue Mion, PLLC

(57) ABSTRACT

A first holder is disposed to move in a direction of a first optical axis of a refractive optical system in which object light incident from a front thereof along the first optical axis is reflected by a prism in a direction along a second optical axis extending vertically to form an image on a CCD solid-state image-pickup element.

4 Claims, 8 Drawing Sheets

(a) FOR UPRIGHT POSTURE (b) FOR NON-UPRIGHT POSTURE

IMAGE TAKING DEVICE

BACKGROUND OF THE INVENTION

1. Field of the Invention

The present invention relates to an image taking device which includes an image-pickup element and which forms a subject image on the image-pickup element to generate an image signal.

2. Description of the Related Art

Some image taking devices include a correcting lens for camera shake correction in a photographic optical system to correct camera shake while moving the correcting lens depending on the result of detection by angular velocity sensors (e.g., see Japanese Patent Application Publication Nos. 10-090587, 11-258649, and 2000-075338). In the case where camera shake is corrected using such a correcting lens, the correcting lens is moved in two directions orthogonal to each other in the lens plane depending on the result of detection by angular velocity sensors so that the camera shake is offset, whereby the camera shake is corrected.

In order to address camera shake, Japanese Patent Application Publication No. 2000-075338 proposes to provide a first holder which holds a correcting lens and a second holder which holds the first holder with the correcting lens that are designed to be respectively driven using electromagnetic coils, so that both the holders can be rapidly moved depending on the result of posture detection by angular velocity sensors. Further, by setting the direction of movement of the first holder holding the correcting lens to the direction of gravity, currents passed through the electromagnetic coils are reduced, thereby enabling reduction in power consumption. Moreover, Japanese Patent Application Publication No. 10-090587 describes that power consumption is further reduced if a refractive optical system is used in an image taking optical system; and since the correcting lens does not need to be moved in the direction of gravity in general shooting in the case where a refractive optical system is used, it is desirable to improve responsiveness to panning by setting the panning direction to a direction perpendicular to both the direction of gravity and the direction of a subject and by disposing the first holder along the panning direction.

However, if the panning direction is set to the direction of movement of the first holder, responsiveness to panning is improved indeed because the first holder moves sensitively, but there is a doubt as to whether responsiveness to camera shake is improved. When the direction of movement of the first holder is set, it is better providing the first holder so as to move in a direction in which the influence of camera shake appears more strongly.

SUMMARY OF THE INVENTION

The present invention has been made in view of the above circumstances and provides an image taking device which includes a refractive optical system and in which a first holder is disposed so that camera shake at the time of shooting can be corrected more effectively.

A first image taking device of the present invention is an image taking device having a refractive optical system by which object light incident from a front thereof along a first optical axis is reflected in a direction along a second optical axis extending vertically to form an image on an image-pickup element, the image taking device generating an image signal by capturing the object light forming the image on the image-pickup element. The image taking device includes: a camera shake detecting unit that detects camera shake; a camera shake correcting lens which corrects camera shake, the camera shake correcting lens being incorporated in the refractive optical system; a first holder that holds the camera shake correcting lens, the first holder being free to move in a horizontal plane in a first direction parallel to the first optical axis; a second holder that holds the first holder, the second holder being free to move in the horizontal plane in a second direction perpendicular to the first optical axis; and a driving unit that drives the camera shake correcting lens held by the first holder and the first holder held by the second holder depending on a result of detection by the camera shake detecting unit, and that moves the camera shake correcting lens and the first holder respectively in the first and second directions in order to correct the camera shake.

Camera shake at the time of shooting is caused by a force for pressing a shutter button being applied to this image taking device. The direction of shake caused by pressing the shutter button is converted to, through a refractive optical system, a first direction parallel to an first optical axis. Accordingly, the first holder is disposed so as to move in the first direction.

Accordingly, the first holder is disposed so as to move in a direction in which when camera shake occurs at the time of shooting, the state of occurrence of the camera shake is reflected strongly, in other words, a direction in which the camera shake correcting lens is driven more frequently.

If the first holder holding only the camera shake correcting lens is thus disposed in the first direction in which the influence of camera shake appears strongly, the camera shake correcting lens can be driven with good responsiveness depending on the state of camera shake detection by the camera shake detecting unit. Further, the first holder can be driven with smaller power than that consumed when the second holder is driven in consideration of weight. Accordingly, the effect of reducing power consumption is obtained.

As described above, the image taking device, which includes the refractive optical system and in which the first holder is disposed so that camera shake at the time of shooting can be more effectively corrected, is realized.

In this respect, the driving unit preferably includes a first electromagnetic coil provided to the first holder, a first yoke, a second electromagnetic coil provided to the second holder, and a second yoke. The first yoke generates any one of attraction and repulsion by a current being passed through the first electromagnetic coil provided integrally with the camera shake correcting lens. The second yoke generates any one of attraction to, and repulsion from, the second electromagnetic coil by a current being passed through the second electromagnetic coil provided to the second holder.

This makes it possible to two-dimensionally drive the correcting lens by passing currents through the first and second electromagnetic coils using a simple configuration in which the first and second electromagnetic coils and the first and second yokes are disposed.

If the configuration of the driving unit is simplified as described above, the driving unit can be miniaturized and, furthermore, the miniaturization, reduction in thickness and weight of the image taking device can be achieved.

A second image taking device of the present invention is an image taking device having a refractive optical system by which object light incident from a front thereof along a first optical axis is reflected in a direction along a second optical axis extending vertically to form an image on an image-pickup element, the image taking device generating an image signal by capturing the object light forming the image on the image-pickup element. The second image taking device includes: a camera shake detecting unit that detects camera shake; a first holder that holds the image-pickup element, the first holder being free to move in a horizontal plane in a first direction parallel to the first optical axis; a second holder which that the first holder, the second holder being free to move in the horizontal plane in a second direction perpendicular to the first optical axis; and a driving unit that drives the image-pickup element held by the first holder and the first holder held by the second holder depending on a result of detection by the camera shake detecting unit, and that moves the image-pickup element and the first holder respectively in the first and second directions in order to correct the camera shake.

In the first image taking device of the present invention, camera shake is corrected by means of two-dimensionally driving the correcting lens. However, in the second image taking device of the present invention, camera shake is corrected by means of two-dimensionally driving the image-pickup element.

In this case as well, if the first holder is disposed so that the direction of movement thereof coincides with the first direction as in the case of the first image taking device, more effective camera shake correction is performed.

As described above, the image taking device, which includes the refractive optical system and in which the first holder is disposed so that camera shake at the time of shooting can be more effectively corrected, is realized.

In this respect, the driving unit preferably includes a first electromagnetic coil provided to the first holder, a first yoke, a second electromagnetic coil provided to the second holder, and a second yoke. The first yoke generates any one of attraction and repulsion by a current being passed through the first electromagnetic coil provided integrally with the image-pickup element. The second yoke generates any one of attraction to, and repulsion from, the second electromagnetic coil by a current being passed through the second electromagnetic coil provided to the second holder.

This makes it possible to constitute the driving unit having a simple configuration as in the first image taking device, and effects similar to those of the first image taking device are obtained.

As described above, the image taking device is realized which includes the refractive optical system and in which the first holder is disposed so that camera shake at the time of shooting is more effectively corrected.

DETAILED DESCRIPTION OF THE INVENTION

Hereinafter, embodiments of the present invention will be described.

Figure 1:
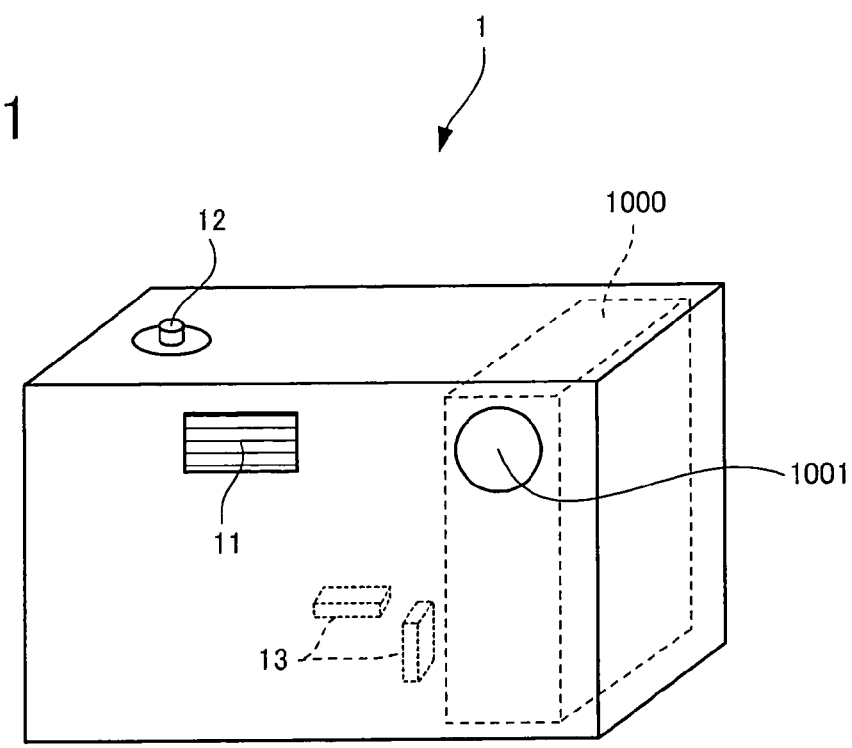
FIG. 1 is a view showing the appearance of a digital camera 1, according to one embodiment of the present invention.

FIG. 1 is a view showing the appearance of a digital camera 1, according to one embodiment of the present invention.

The digital camera 1 shown in FIG. 1 includes a refractive optical system 1000 by which object light incident from the front thereof along a first optical axis is reflected in a direction along a second optical axis extending vertically to form an image on a CCD solid-state image-pickup element that will be described later in detail. FIG. 1 shows only an objective lens 1001 having the first optical axis among components constituting the refractive optical system 1000. Beside the objective lens 1001, a light emitting window 11 is provided. From the light emitting window 11, fill light for shooting is emitted. On the upper surface of the camera body, a shutter button 12 is provided.

Further, the digital camera 1 of this embodiment includes angular velocity sensors 13 (having a biaxial configuration) for detecting camera shake. Depending on the state of the camera shake detected by the angular velocity sensors 13, a camera shake correcting lens is driven by a driving unit for camera shake correction, which will be described later in detail, to correct the camera shake with high accuracy.

Figure 2:
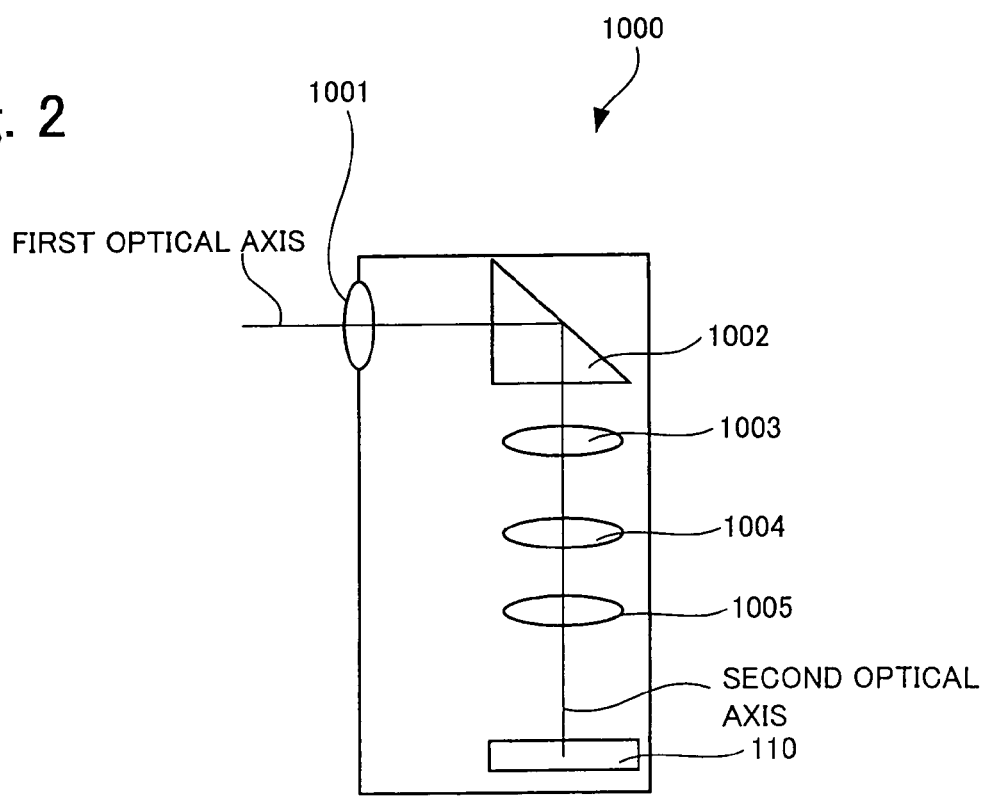
FIG. 2 is a view showing the configuration of a refractive optical system.
Figure 3:
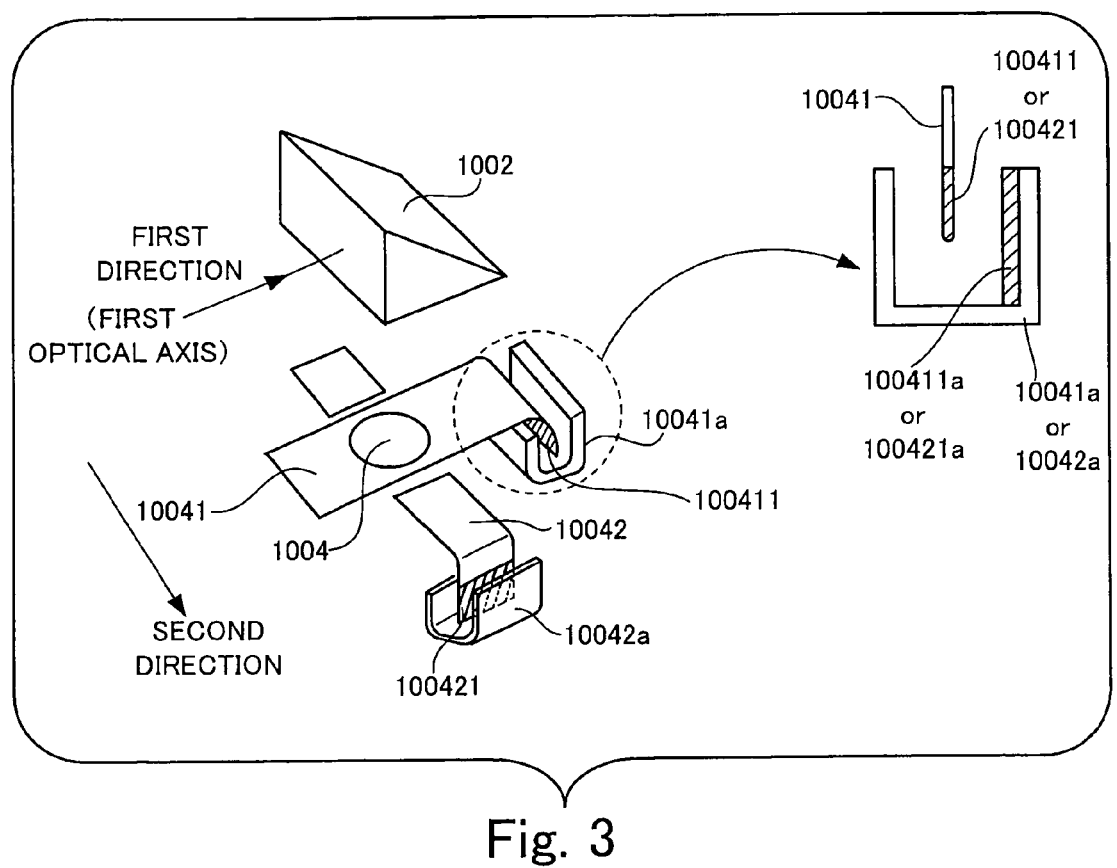
FIG. 3 is a view showing the schematic configuration of a driving unit for driving a camera shake correcting lens incorporated in the refractive optical system.

FIG. 2 is a view showing the configuration of the refractive optical system 1000, and FIG. 3 is a view showing the schematic configuration of a driving section for driving a camera shake correcting lens 1004 incorporated in the refractive optical system 1000. It should be noted that in FIG. 3, a prism 1002 is also shown in order to more clearly show the placement of the correcting lens 1004.

As shown in FIG. 2, the digital camera 1 includes the refractive optical system 1000 in which object light incident from the front along the first optical axis is passed through the objective lens 1001 shown in FIG. 1 and reflected by the prism 1002 in a direction along the second optical axis extending vertically to form an image on a CCD solid-state image-pickup element 110. In this example, the refractive optical system 1000 is shown in which the object light reflected by the prism 1002 reaches the CCD solid-state image-pickup element 110 through a zoom lens 1003, the correcting lens 1004, and a focus lens 1005.

As shown in FIG. 3, the camera shake correcting lens 1004 incorporated in the refractive optical system 1000 is held by both a first holder 10041 which holds the camera shake correcting lens 1004 in such a manner that the first holder 10041 is free to move in a first direction parallel to the first optical axis in a horizontal plane, and a second holder 10042 which holds the first holder 10041 in such a manner that the second holder 10042 is free to move in a second direction perpendicular to the first optical axis in the horizontal plane.

As shown in FIG. 3, one ends of the first and second holders 10041 and 10042 are bent to form bent sections. In these bent sections, a first electromagnetic coil 100411 and a second electromagnetic coil 100421 are provided, respectively. U-shaped first and second yokes 10041a and 10042a, each of which consists of a magnetic circuit, are disposed to surround the first and second electromagnetic coils 100411 and 100421 of the bent sections from both sides, respectively. Magnets 100411a and 100421a for generating attraction to, and repulsion from, the electromagnetic coils 100411 and 100421 are attached to the inner walls of one ends of these U-shaped yokes 10041a and 10042a, respectively. Accordingly, when a current is passed through the first electromagnetic coil 100411, attraction or repulsion is generated between the first electromagnetic coil 100411 and the magnet 100411a provided to the first yoke 10041*a*. Similarly, when a current is passed through the second electromagnetic coil 100421, attraction or repulsion is generated between the second electromagnetic coil 100421 and the magnet 100421*a* provided to the second yoke 10042*a*. In this respect, if the current passed through each of the electromagnetic coils 100411 and 100421 is appropriately changed, the attraction to or the repulsion from the magnets 100411*a* and 100421*a* is changed, whereby the position of the camera shake correcting lens 1004 is adjusted.

Figure 4:
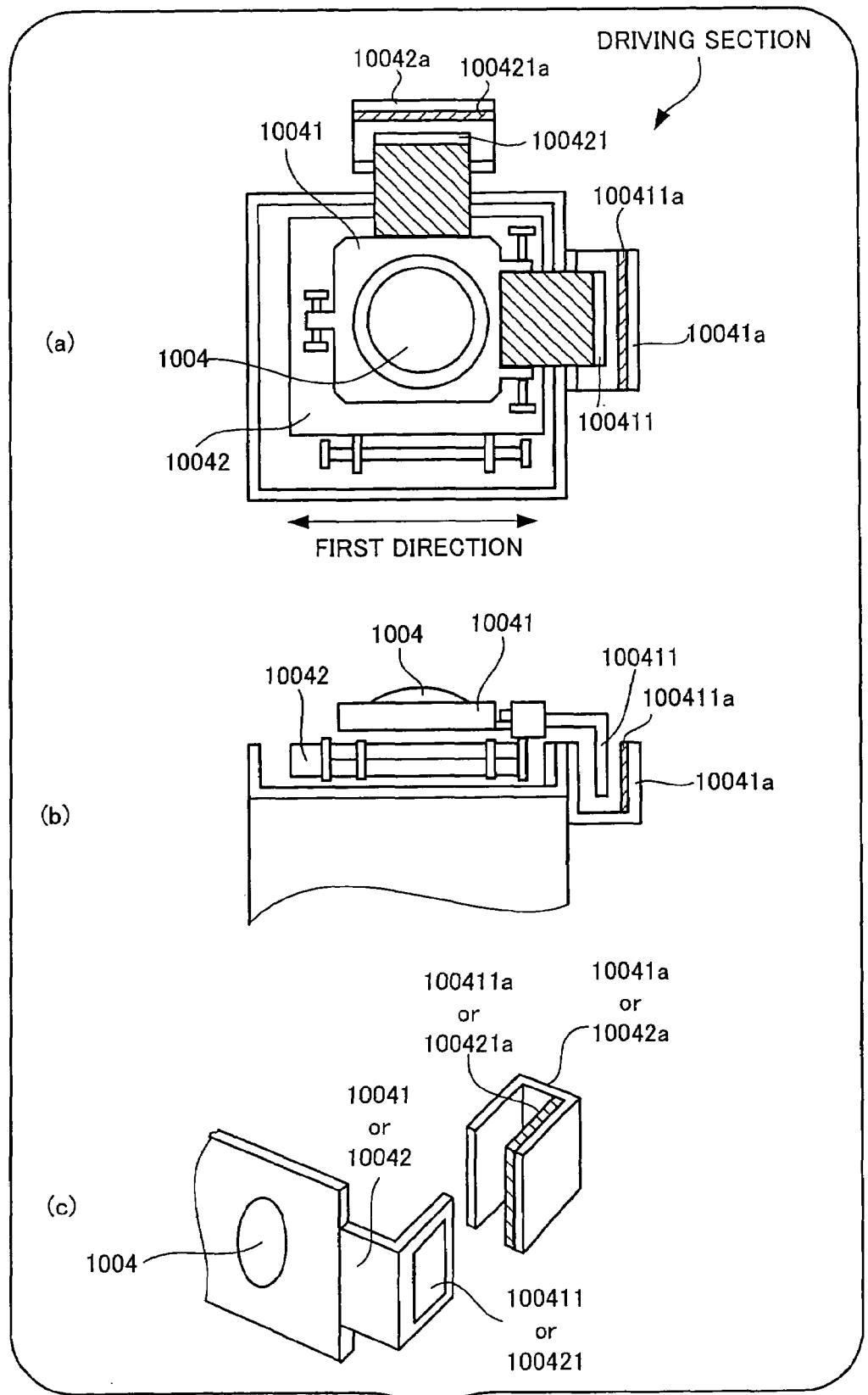
FIG. 4 is a view showing details of the configuration of the driving unit including an electromagnetic coil.

FIG. 4 is a view showing details of the configuration of the driving section including the first and second electromagnetic coils 100411 and 100421. Part (a) of FIG. 4 is a top view, Part (b) of FIG. 4 is a side view, and Part (c) of FIG. 4 is a view for explaining the configuration of an engaging section between the electromagnetic coil and the yoke.

As shown in Part (a) of FIG. 4, the driving section for driving the correcting lens 1004 includes the first electromagnetic coil 100411 provided to the first holder 10041, the first yoke 10041*a* which generates attraction or repulsion by passing a current through the first electromagnetic coil 100411 provided integrally with the camera shake correcting lens 1004, the second electromagnetic coil 100421 provided to the second holder 10042, and the second yoke 10042*a* which generates attraction to, or repulsion from, the second electromagnetic coil 100421 by passing a current through the second electromagnetic coil 100421 provided to the second holder 10042.

As described previously, the magnets 100411*a* and 100421*a* are attached respectively to the inner walls of one ends of the U-shaped first and second yokes 10041*a* and 10042*a* (see Part (c) of FIG. 4). Accordingly, when the magnitude of a current passed through the electromagnetic coils 100411 or 100421 changes, the magnitude of attraction or repulsion between the electromagnetic coil 100411 or 100421 and the respective magnet 100411*a* or 100421*a* changes, whereby the position of the correcting lens 1004 is adjusted with high accuracy.

Moreover, as described previously, the first holder 10041 is disposed so as to move in the first direction parallel to the first optical axis in which the influence of camera shake appears more strongly. Accordingly, when the state of camera shake is detected by the angular velocity sensors 13 (see FIG. 1), the first holder 10041 is quickly driven to move together with the camera shake correcting lens in a direction in which the camera shake is offset, depending on the result of detection by the angular velocity sensors 13.

Figure 5:
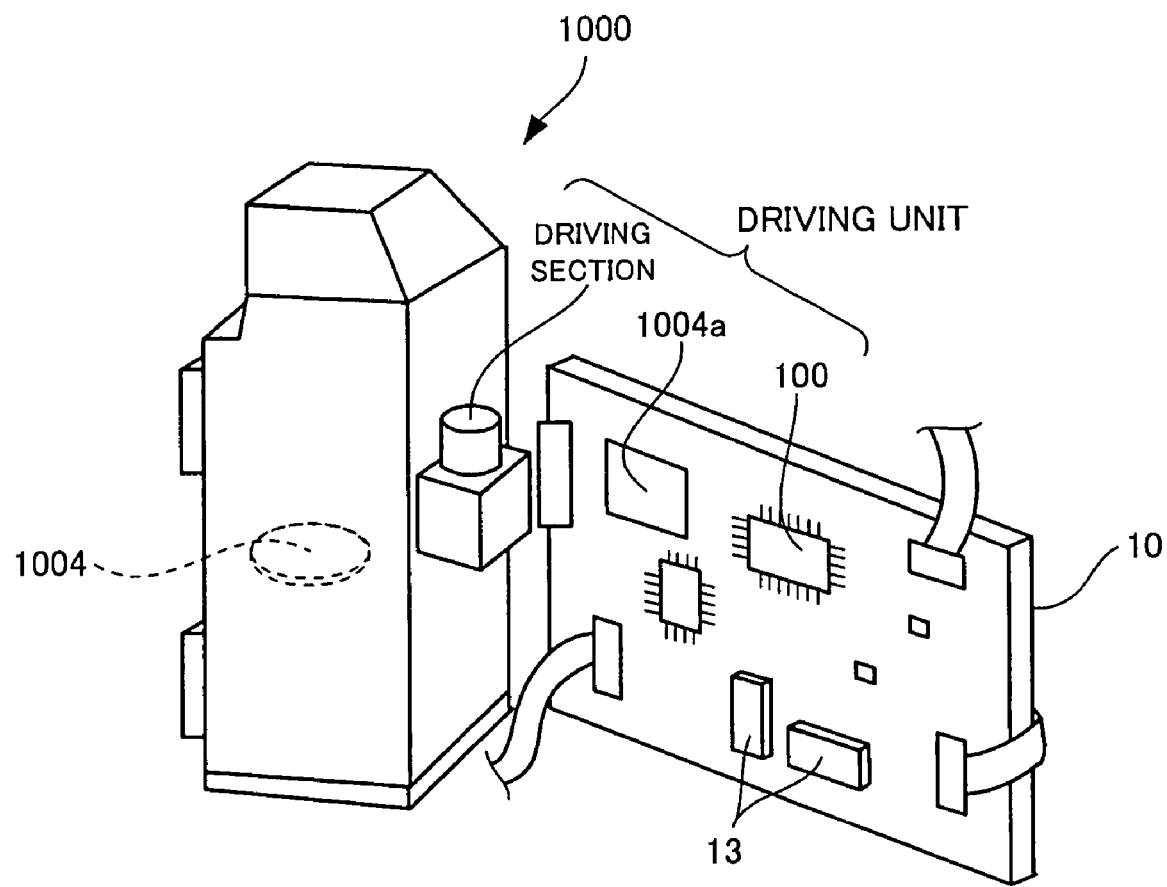
FIG. 5 is a view for explaining the positional relationship between the refractive optical system and a main substrate on which a CPU is mounted.

FIG. 5 is a view for explaining the positional relationship between the refractive optical system 1000 and a main substrate 10 on which a CPU 100 is mounted. On this main substrate 10, the angular velocity sensors 13 shown in FIG. 1 are also mounted.

If the CPU 100 and the angular velocity sensors 13 are mounted on the main substrate 10 as described, the CPU 100 can quickly gives instructions to a driving circuit 1004*a* upon receiving the state of camera shake detected by the angular velocity sensors 13. Further, it becomes possible to pass currents through the first and second electromagnetic coils in the driving section disposed on the periphery of the refractive optical system 1000 using short wiring extended from the main substrate 10, respectively. Accordingly, it becomes possible to drive the first holder 10041 rapidly in response to detection by the angular velocity sensors 13.

Furthermore, as shown in FIGS. 4 and 5, the driving section including electromagnetic coils and magnet-attached yokes is very small and does not occupy much space. Accordingly, the refractive optical system 1000 and the driving section can be accommodated in a small vacant space, and the main substrate 10 on which the CPU 100 and the driving circuit 1004*a* consisting of a driving unit can be disposed beside the refractive optical system. Thus, it also becomes possible to reduce the thickness of this image taking device.

Figure 6:
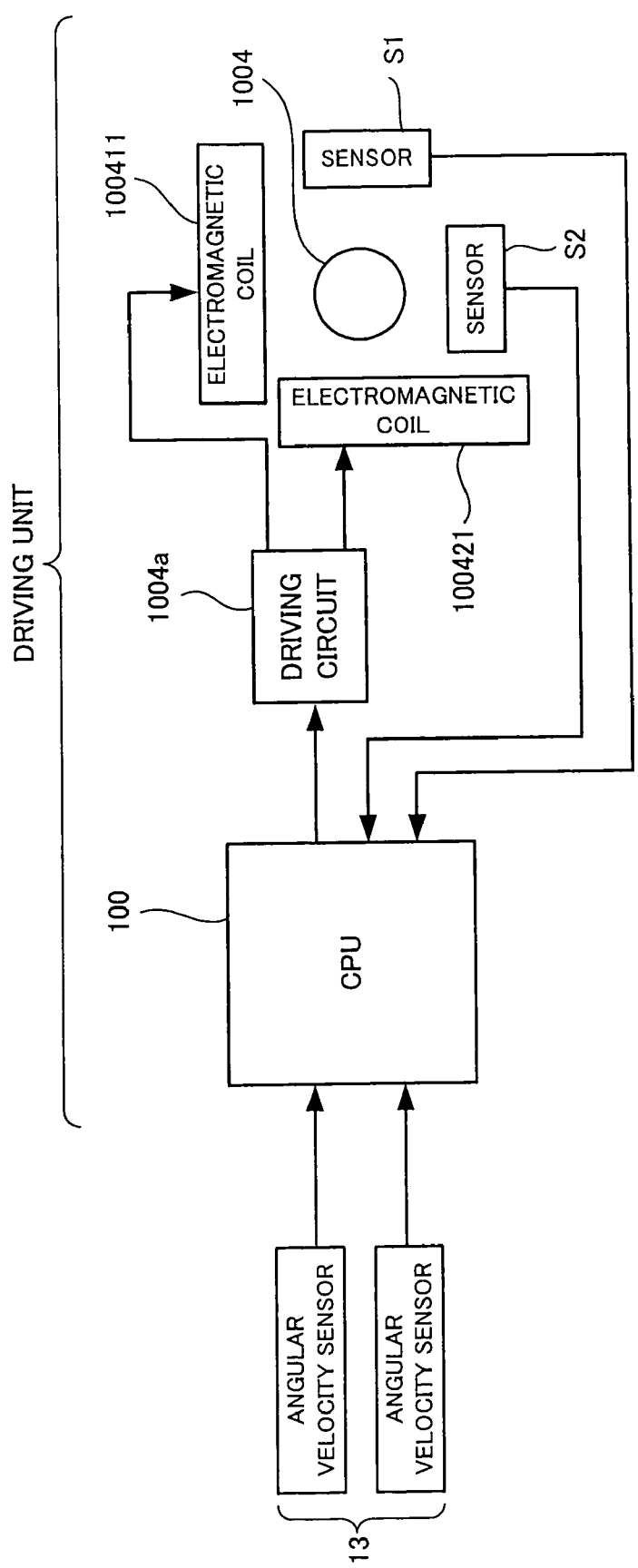
FIG. 6 is a diagram showing the circuit configuration of the main substrate and the relationship between the main substrate and the driving unit.

FIG. 6 is a block diagram showing the configuration of the driving unit.

In this embodiment, as shown in FIG. 6, camera shake is detected by the biaxial angular velocity sensors 13. Based on the result of detection by the angular velocity sensors 13, the driving circuit 1004*a* is instructed to pass currents through the first and second electromagnetic coils 100411 and 100421 in the driving section, respectively, thus generating magnetic force in the electromagnetic coils and generating attraction to or repulsion from the magnets 100411*a* and 100421*a* (see FIG. 4), whereby the positions of the holders 10041 and 10042 are adjusted. These biaxial angular velocity sensors correspond to the camera shake detecting unit in the present invention.

Further, in this example, to enable the CPU 100 to always grasp the position of the correcting lens 1004 when the CPU 100 controls the position of the correcting lens 1004, sensors (line sensors or the like) S1 and S2 are respectively provided along the directions in which the correcting lens 1004 is moved, thus making it possible to two-dimensionally detect the position of the correcting lens 1004. This enables the CPU 100 to always grasp the position of the correcting lens 1004 based on the result of detection by the sensors S1 and S2. Accordingly, the correcting lens 1004 is suitably driven into a desired position.

Moreover, with the configuration shown in FIG. 6, it also becomes possible to determine whether the digital camera 1 is in the posture shown in FIG. 1 (hereinafter referred to as "an upright posture") or in a posture different from the upright posture (hereinafter referred to as a "non-upright posture") by utilizing the fact that the respective values of the currents, which are passed through the first and second electromagnetic coils 100411 and 100421 in order to hold the correcting lens at a normal position (hereinafter referred to as "a neutral position"), differ depending on whether shooting is performed in a state where the digital camera 1 shown in FIG. 1 is set in the upright posture or in the non-upright posture.

Thus, the correcting lens 1004 is appropriately driven depending on the result of detection by the angular velocity sensors 13 for each posture (upright or non-upright) of the image taking device. Accordingly, regardless of how a user sets the image taking device to perform shooting, suitable camera shake correction is performed by the driving unit provided to the image taking device.

Figure 7:
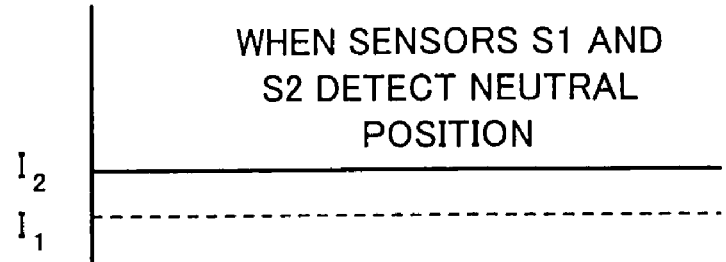
FIG. 7 is a view for explaining a state in which the CPU distinguishes between an upright posture and a posture different from the upright posture.
Figure 7:
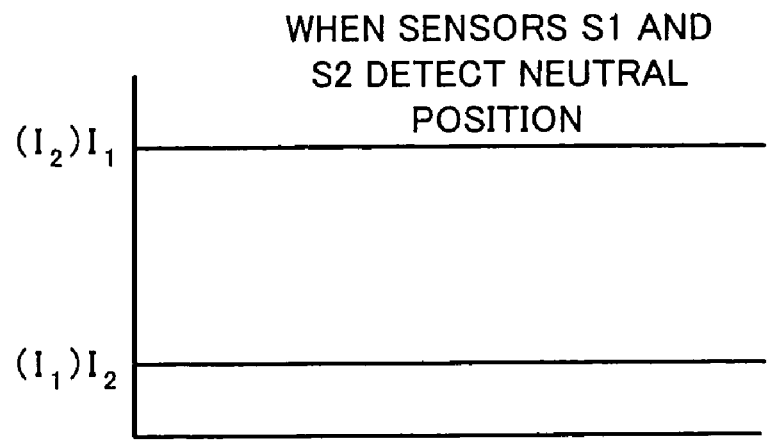

FIG. 7 is a view for explaining the differences in the values of the currents flowing through the coils between the case where the image taking device is set in the upright posture and the case in the non-upright posture. In this drawing, the current value I1 is the value of a current which needs to be passed through the first electromagnetic coil 100411 in order to hold the correcting lens 1004 at the neutral position, and the current value I2 is the value of a current which needs to be passed through the second electromagnetic coil 100421 in order to hold the correcting lens 1004 at the neutral position.

As shown in part (a) of FIG. 7, in the case where there is not so much difference between the current values I1 and I2 at the time when both the sensors S1 and S2 detect that the correcting lens 1004 is at the neutral position, the CPU 100 can determine that the image taking device is set in the upright posture. On the other hand, as shown in part (b) of FIG. 7, in the case where the image taking device is set in a non-upright posture, an obvious difference occurs between the current values I1 and I2.

If the relationship between the difference in current value and the posture is stored in a table or the like, the shake correcting lens can be suitably driven depending on how the digital camera 1 is set.

Figure 8:
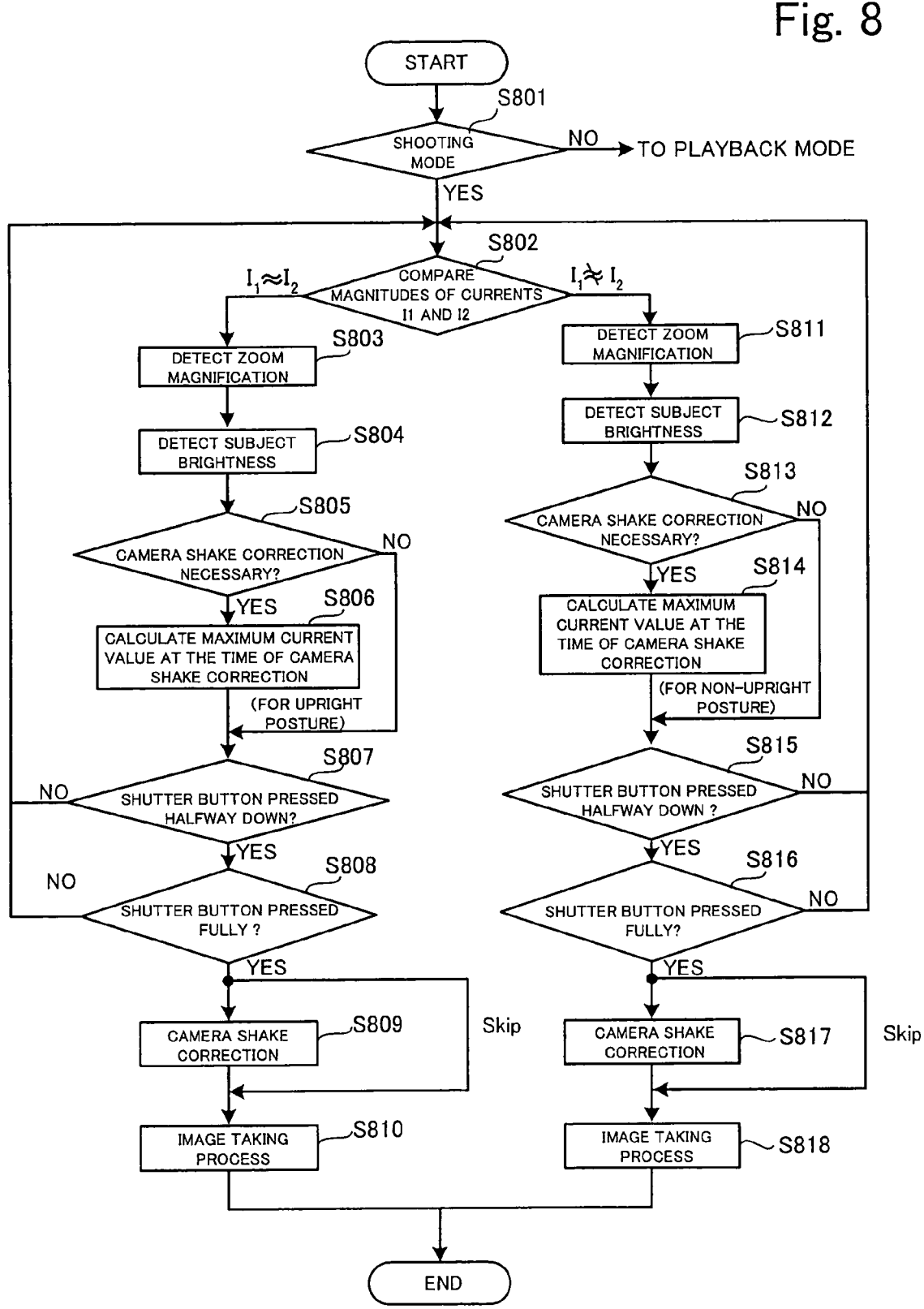
FIG. 8 is a flowchart for explaining an image taking process performed by the CPU.

FIG. 8 is a flowchart for explaining an image taking process performed by the CPU 100.

When a power switch is pressed to turn on the power, the CPU starts the process of this flow.

In the next step S801, a determination is made as to whether a shooting mode is on. If it is determined that the shooting mode is on, the Yes branch is followed, and posture detection is performed in step S802. In this respect, as described using FIG. 7, a determination is made as to whether the digital camera 1 is in the upright posture or in the other posture by comparing the magnitudes of the values I1 and I2 of the currents passed through the first and second electromagnetic coils 100411 and 100421. If the current values are approximately equal and it is determined that the digital camera 1 is in the upright posture in step S802, the flow goes to step S803. Thereafter, zoom magnification detection and subject brightness detection are respectively performed in steps S803 and S804, and the process goes to step S805. In step S805, a determination is made as to whether camera shake correction needs to be performed, based on the zoom magnification detected in step S803 and the subject brightness detected in step S804. In this step S805, if it is determined that camera shake correction is necessary based on the zoom magnification and the subject brightness, the values of the maximum currents for the upright posture, which are respectively passed through the electromagnetic coils at the time of camera shake correction, and the like, are calculated in preparation for suitable camera shake correction at the time of shooting. The process goes to the next step S807, and a determination is made as to whether the shutter button is pressed halfway down. If it is determined that the shutter button is not pressed halfway down in this step S807, the process goes back to step S802, and the process from step S802 is repeated. If it is determined that the shutter button is pressed halfway down in step S807, the process goes to step S808, and a determination is made as to whether the shutter button is pressed all the way down this time. In this respect, if the shutter button is returned from the halfway pressed state to the original place, the process goes back to step S802, and the process from step S802 is repeated. If it is determined that the shutter button is pressed all the way down in step S808, the process goes to the next step S809, and camera shake correction is performed while mainly moving the first holder 10041 depending on the state of camera shake. Then, an image taking process is performed in the next step S810, and the process of this flow is ended.

If it is determined that camera shake correction is unnecessary based on the zoom magnification and the subject brightness in step S805, the process follows the No branch to skip step S806 and goes to step S807. In step S807, a determination is made as to whether the shutter button is pressed halfway down. If the shutter button is not pressed halfway down, the No branch is followed, the process goes back to step S802, and the process from step S802 is repeated. If the shutter button is pressed halfway down in step S807, the process goes to the next step S808, and a determination is made as to whether the shutter button is pressed all the way down. If it is determined that the shutter button is pressed all the way down in this step S808, step S809 is skipped, and an image taking process is performed in step S810. Then, the process of this flow is ended.

If a determination is made that the currents I1 and I2 differ to some extent in step S802, the process goes to step S811. Zoom magnification is detected in this step S811, and then the process goes to the next step S812. In step S812, subject brightness is detected. Then, the process goes to the next step S813. In step S813, a determination is made as to whether camera shake correction needs to be performed, based on the zoom magnification detected in the process of step S811 and the subject brightness detected in step S812. If it is determined that camera shake correction is necessary based on the zoom magnification and the subject brightness value in this step S813, the process goes to step S814, and the values of maximum currents for a non-upright posture, which are respectively passed through the electromagnetic coils at the time of camera shake correction, and the like, are calculated in preparation for suitable camera shake correction. The process goes to the next step S815, and a determination is made as to whether the shutter button is pressed halfway down. If it is determined that the shutter button is not pressed halfway down in this step S815, the process goes back to step S802, and the process from step S802 is repeated. If the shutter button is pressed halfway down in step S815, the process goes to step S816, and a determination is made this time as to whether the shutter button is pressed all the way down. In this respect, if the shutter button is returned from the halfway pressed state to the original position, the process goes back to step S802, and the process from step S802 is repeated. If it is determined that the shutter button is pressed all the way down in step S816, the process goes to the next step S817, and camera shake correction is performed while mainly moving the first holder 10041 depending on the state of camera shake. Then, an image taking process is performed in the next step S818, and the process of this flow is ended.

If it is determined that camera shake correction is unnecessary based on the zoom magnification and the subject brightness in step S813, the process follows the No branch to skip step S814 and goes to step S815. In step S815, a determination is made as to whether the shutter button is pressed halfway down. If the shutter button is not pressed halfway down, the No branch is followed, the process goes back to step S802, and the process from step S802 is repeated. On the other hand, if the shutter button is pressed halfway down in step S815, the process goes to the next step S816, and a determination is made as to whether the shutter button is pressed all the way down. If it is determined that the shutter button is pressed all the way down in this step S816, step S817 is skipped, and an image taking process is performed in step S818. Then, the process of this flow is ended.

Because of this process, suitable camera shake correction is performed depending on the posture of the digital camera at the time of shooting.

In this embodiment, an example is shown in which biaxial angular velocity sensors are used as the camera shake detecting unit in the present invention. However, the invention can be also applied to the case where triaxial angular velocity sensors are used.

Figure 9:
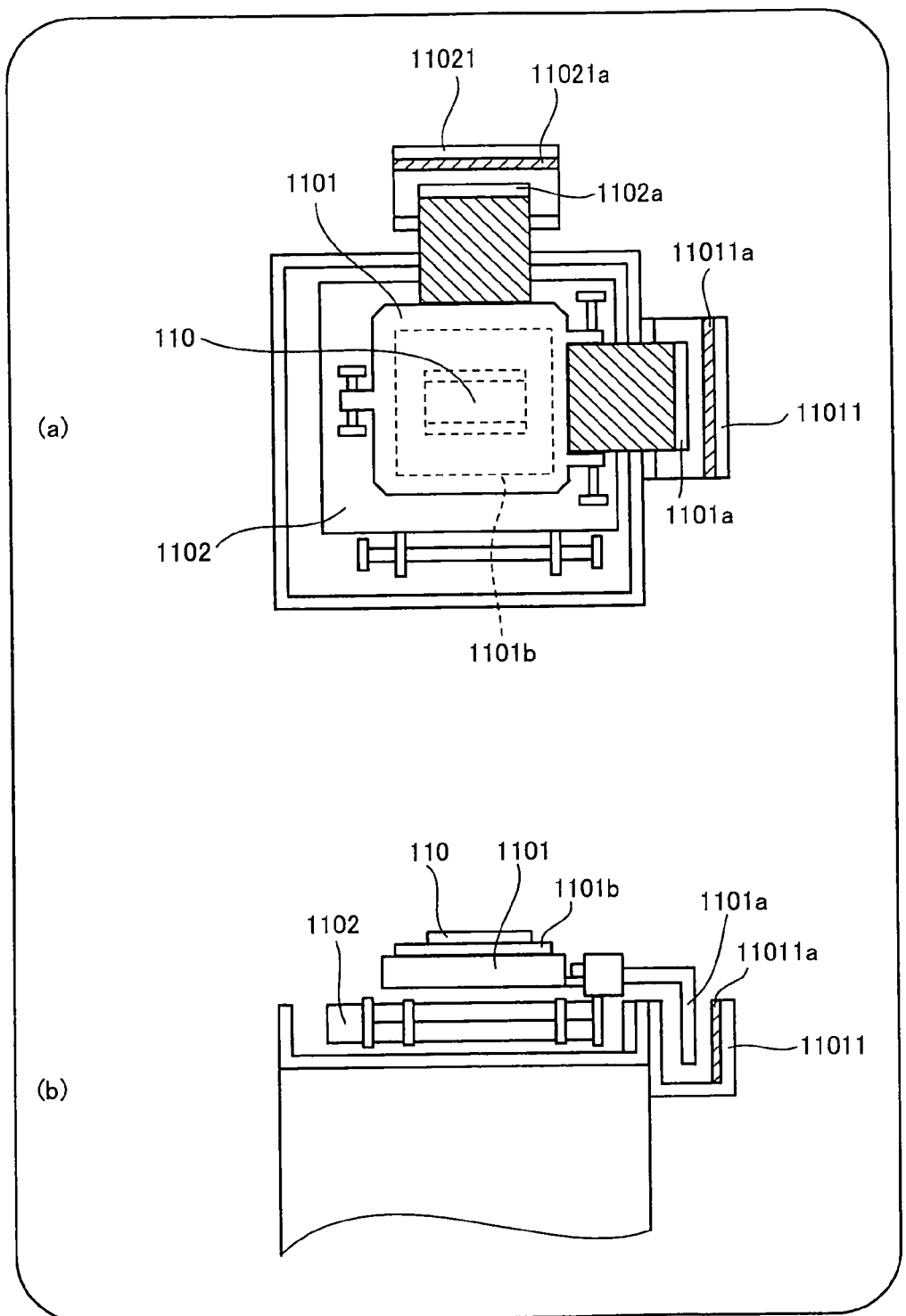
FIG. 9 is a view showing a second embodiment.

FIG. 9 is a view showing a second embodiment.

In the first embodiment, the correcting lens 1004 is two-dimensionally driven. However, in the second embodiment, the CCD solid-state image-pickup element 110 is two-dimensionally driven instead of the correcting lens 1004.

In FIG. 9, shown is the configuration of a driving section which two-dimensionally drives the CCD solid-state image-pickup element 110. The configuration thereof is completely the same as that shown in FIG. 4, except for the fact that such a correcting lens 1004 as that shown in FIG. 4 is replaced by the CCD solid-state image-pickup element 110.

As shown in FIG. 9, the driving section includes a first holder 1101 which holds the CCD solid-state image-pickup element 110 together with a substrate 1101b having the CCD solid-state image-pickup element 110 mounted thereon in such a manner that the first holder 1101 is free to move in the first direction parallel to the first optical axis in the horizontal plane, and a second holder 1102 which holds the first holder 1101 in such a manner that the second holder 1102 is free to move in the horizontal plane in the second direction perpendicular to the first optical axis. The CCD solid-state image-pickup element 110 held by the first holder 1101, and the first holder 1101 held by the second holder 1102, are individually driven depending on the result of detection by the angular velocity sensors 13 which are the camera shake detecting unit, whereby camera shake is corrected.

With this configuration, the first holder 1101 is disposed in a direction in which the influence of camera shake appears strongly, and the CCD solid-state image-pickup element 110 is driven with good responsiveness depending on the camera shake at the time of shooting so that camera shake is offset.

Thus, when the CCD solid-state image-pickup element 110 is two-dimensionally driven instead of the correcting lens 1004 shown in FIG. 4, effects similar to those of the first embodiment can also be obtained.

What is claimed is:

1. An image taking device including a refractive optical system by which object light incident from a front thereof along a first optical axis is reflected in a direction along a second optical axis extending vertically to form an image on an image-pickup element, the image taking device generating an image signal by capturing the object light forming the image on the image-pickup element, the image taking device comprising:

a camera shake detecting unit that detects camera shake;

a camera shake correcting lens that corrects camera shake, the camera shake correcting lens being incorporated in the refractive optical system;

a first holder that holds the camera shake correcting lens, the first holder being free to move in a horizontal plane in a first direction parallel to the first optical axis;

a second holder that holds the first holder, the second holder being free to move in the horizontal plane in a second direction perpendicular to the first optical axis; and a driving unit that drives the camera shake correcting lens held by the first holder and the first holder held by the second holder depending on a result of detection by the camera shake detecting unit, and that moves the camera shake correcting lens and the first holder respectively in the first and second directions in order to correct the camera shake.

2. The image taking device according to claim 1, wherein the driving unit comprises:

a first electromagnetic coil provided to the first holder;

a first yoke that generates any one of attraction and repulsion by a current being passed through the first electromagnetic coil provided integrally with the camera shake correcting lens;

a second electromagnetic coil provided to the second holder; and a second yoke that generates any one of attraction to, and repulsion from, the second electromagnetic coil by a current being passed through the second electromagnetic coil provided to the second holder.

3. An image taking device including a refractive optical system by which object light incident from a front thereof along a first optical axis is reflected in a direction along a second optical axis extending vertically to form an image on an image-pickup element, the image taking device generating an image signal by capturing the object light forming the image on the image-pickup element, the image taking device comprising:

a camera shake detecting unit that detects camera shake;

a first holder that holds the image-pickup element, the first holder being free to move in a horizontal plane in a first direction parallel to the first optical axis;

a second holder that holds the first holder, the second holder being free to move in the horizontal plane in a second direction perpendicular to the first optical axis; and a driving unit that drives the image-pickup element held by the first holder and the first holder held by the second holder depending on a result of detection by the camera shake detecting unit, and that moves the image-pickup element and the first holder respectively in the first and second directions in order to correct the camera shake.

4. The image taking device according to claim 3, wherein the driving unit comprises:

a first electromagnetic coil provided to the first holder;

a first yoke that generates any one of attraction and repulsion by a current being passed through the first electromagnetic coil provided integrally with the image-pickup element;

a second electromagnetic coil provided to the second holder; and a second yoke that generates any one of attraction to, and repulsion from, the second electromagnetic coil by a current being passed through the second electromagnetic coil provided to the second holder.

* * * * *